United States Patent
Drori

[11] 4,011,884
[45] Mar. 15, 1977

[54] LIQUID-LEVEL VALVING DEVICE PARTICULARLY USEFUL AS AUTOMATIC RELIEF VALVE

[76] Inventor: Mordeki Drori, 89 Zahal St., Kiron, Israel

[22] Filed: Feb. 4, 1975

[21] Appl. No.: 546,913

[30] Foreign Application Priority Data

Feb. 12, 1974 Israel .................................. 44200

[52] U.S. Cl. .............................. 137/202; 137/415
[51] Int. Cl.² ........................................ F16K 31/34
[58] Field of Search .......... 137/202, 195, 192, 415; 251/38, 63

[56] References Cited

UNITED STATES PATENTS

| | | | |
|---|---|---|---|
| 952,605 | 3/1910 | Connors | 251/63 |
| 1,122,994 | 12/1914 | Pappano | 137/192 |
| 1,296,206 | 3/1919 | Morali | 137/415 |
| 1,914,645 | 6/1933 | Power | 251/63 |
| 2,247,930 | 7/1941 | Turner | 137/202 X |
| 2,603,493 | 7/1952 | Rusconi | 137/202 |
| 2,999,509 | 9/1961 | Hankison | 137/415 X |
| 3,054,419 | 9/1962 | Farrell | 137/202 |
| 3,635,238 | 1/1972 | Hankison | 137/415 X |

*Primary Examiner*—Alan Cohan
*Attorney, Agent, or Firm*—Benjamin J. Barish

[57] ABSTRACT

A liquid-level valving device, particularly useful as an air-relief valve, comprises a housing including a first chamber having a control member axially movable in an opening therein, and a second chamber defined by a piston carried at the opposite end of the control member and a cylinder fixed to the housing. The second chamber has a small vent opening through which the control member extends, the latter having an axial bore establishing communication between the two chambers. The cross-sectional area of the first-chamber end of the control member is less than that of its second-chamber end, and the mouth of the bore at the former end of the control member is of larger diameter than that of the vent opening in the second chamber, such that upon an increase in pressure in the first chamber, the pressure in the second chamber is likewise increased to cause the control member to be moved further into the first chamber to open the valve.

The foregoing device is disclosed as embodied in an air-relief valve having a float in the first chamber coaxial with the control member for closing and opening its bore according to the level of the liquid in the first chamber.

5 Claims, 6 Drawing Figures

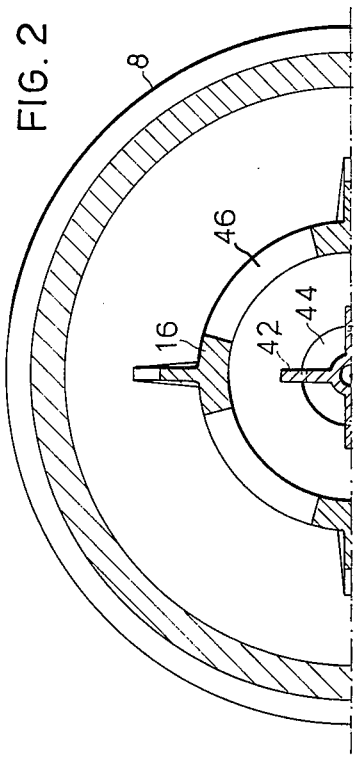
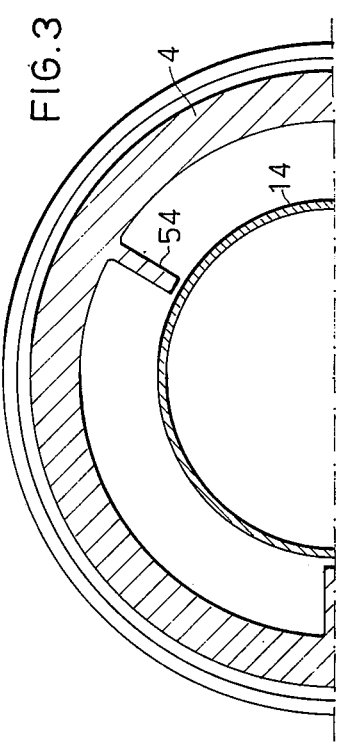
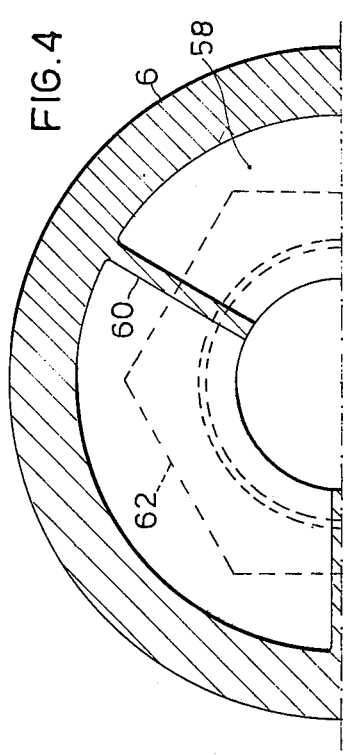
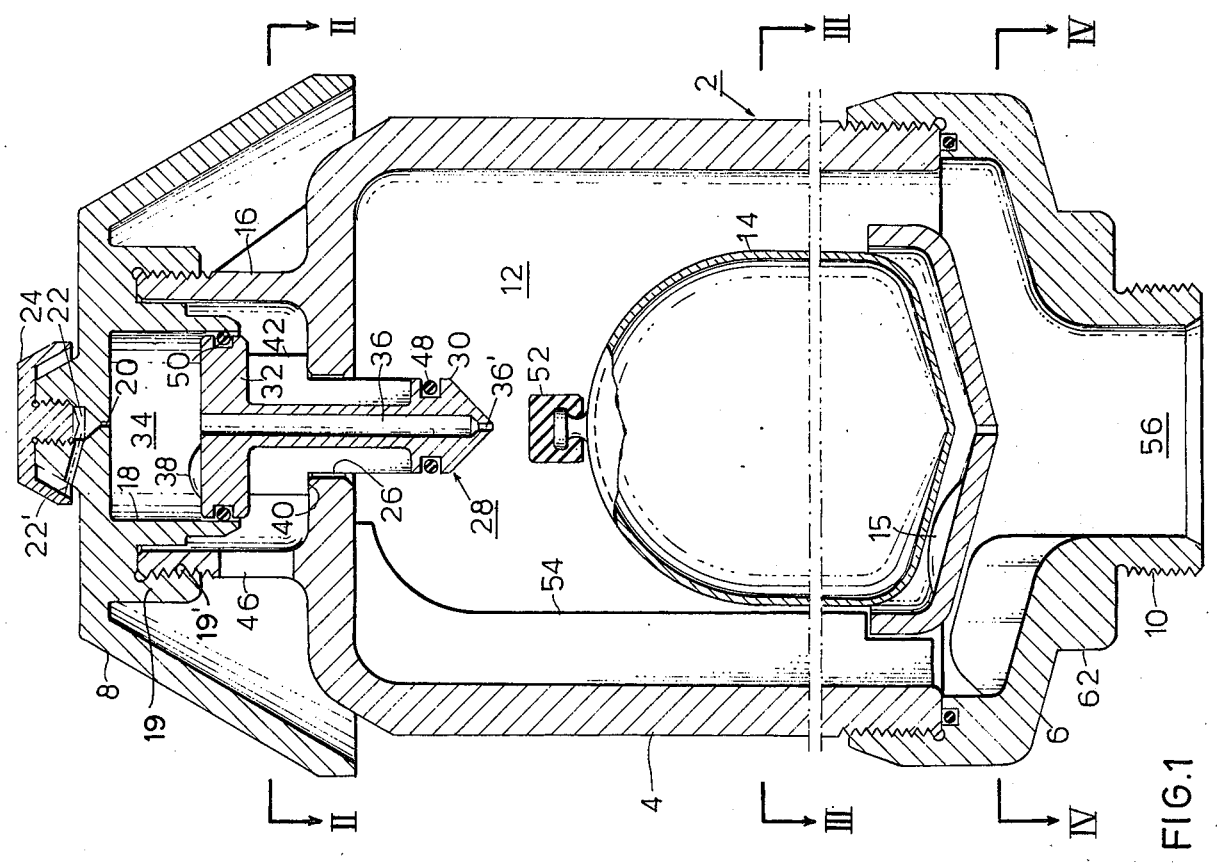

LIQUID-LEVEL VALVING DEVICE PARTICULARLY USEFUL AS AUTOMATIC RELIEF VALVE

BACKGROUND OF THE INVENTION

The present invention relates to liquid-level valving devices. It is especially useful with respect to automatic relief valves, particularly air-relief valves used to release air (or other gases) from lines carrying water (or other liquids), and is therefore described below with respect to that application.

Air in water lines can be extremely dangerous, since it can produce water hammer of such pressure as to burst a pipe. Various types of air-relief valves have been provided to release such air from the pipe without permitting the water (or other liquids) to escape.

One type of air-relief valve, called the small-orifice type, automatically releases air that may accumulate under pressure in sections of a pipe line during normal working conditions when the line is under pressure. This type usually includes a buoyant ball for sealing the orifice. As air accumulates in the upper part of the valve chamber, it gradually depresses the water level, reducing the upward thrust on the ball until the ball drops and the high pressure air discharges. Upon the discharge of the air, the pressure drops, and the water level rises again until the ball reseals the orifice. The buoyant balls in such valves are usually of very large diameter and of heavy weight to ensure they will not be held against the orifice by air alone, and therefore such valves are very bulky and costly.

The present invention provides a liquid-level valving device which is particularly useful for producing a new type of automatic relief valve for separating a gas from a liquid, and vice versa. The present invention also provides a novel automatic relief valve including the above valving device.

BRIEF SUMMARY OF THE INVENTION

According to one aspect of the invention, there is provided a liquid-level valving device, comprising a housing defining a first chamber having an opening in the wall thereof; a control member axially movable in said opening and having a first end disposed within said first chamber; and a second chamber defined by a piston and a cylinder one of which is carried at the opposite end of the control member and the other of which is fixed to the housing. The second chamber has a small vent opening in its wall, and the control member is formed with an axial bore establishing communication between the two chambers. The cross-sectional area of the end of the control member in the first chamber is less than that of its opposite end in the second chamber, and the mouth of the bore at the end of the control member in the first chamber is of larger diameter than that of the vent opening in the second chamber. The device further includes a float movable in the first chamber coaxial with and axially spaced from the control member. A sealing element is fixed to the end of the float to face the first end of the control member. The float is movable towards and away from the first end of the control member for closing or opening its bore according to the quantity of liquid in the first chamber. A valve communicating with the first chamber is operated by the control member such as to be opened upon the movement of the control member further into the first chamber, and to be closed upon the movement of the control member in the opposite direction. The arrangement is such that upon an increase in pressure in the first chamber, the pressure in the second chamber is likewise increased. This pressure, by virtue of the larger surface area in the second chamber, causes the control member to be moved further into the first chamber and thereby to open the valve.

According to another aspect of the invention, there is provided an automatic relief valve for separating a gas from a liquid, or vice versa, wherein the valve constitutes a large-orifice vent which is opened upon movement of the control member further into the first chamber and is closed upon movement of the control member further into the second chamber.

Such an air-relief valve can be constructed at a fraction of the size, weight, and cost of the previously used one mentioned above.

Different arrangements may be used for providing the large vent. In one described arrangement, the large vent is produced by recesses formed axially of the control member for a part of the length between its two ends. In another described arrangement, the large vent includes a separate large opening formed in the first chamber, a valve member seatable within the large vent opening, and linkage connecting the control member to the valve member to unseat the latter from the large vent opening when the control member moves further into the first chamber, and to seat same therein when the control member moves further into the second chamber.

BRIEF DESCRIPTION OF THE DRAWINGS

The invention and its mode of operation will be better understood by the description below of two preferred embodiments as illustrated in the accompanying drawings, wherein:

FIG. 1 is a longitudinal sectional view of one form of air-relief valve constructed in accordance with the invention;

FIGS. 2–4 are transverse sectional views along lines II—II, III—III, and IV—IV, respectively, of FIG. 1;

EMBODIMENT OF FIGS. 1–5

Figure 6:
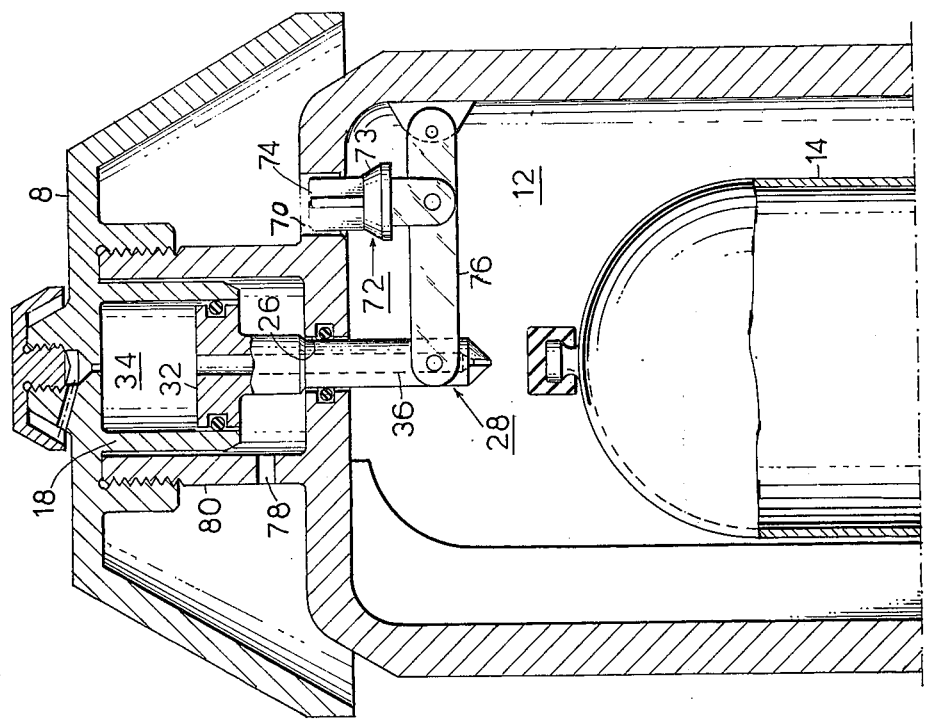
FIG. 6 is a partial view corresponding to that of FIG. 1 but illustrating a variation in the construction of the large vent.

The air-relief valve illustrated in FIGS. 1–5 comprises a three-section housing, generally designated 2, including a cylindrical section 4 threadedly receiving a base section 6 at its lower end and a cap section 8 at its upper end. The lower end of base 6 is externally threaded, as shown at 10, for attachment to a water line or the like.

The housing defines a first or main chamber 12 in which a float 14 is disposed, the float having a substantially cylindrical side wall closed at the top and bottom, and being spaced from the bottom of the housing by embossments 15. The upper end of housing section 4 is formed with an annular array of spaced supporting posts 16 which are threaded at their free ends for receiving cap 8 of the housing. The latter cap is formed with an inner annular wall 18 and an outer annular wall 19 coaxial with wall 18 and internally threaded as shown at 19' for threading onto the outer end of the supporting posts 16.

A small vent opening 20 is formed centrally of cap 8. The vent opening leads to a cavity 22 formed with threads for receiving a dust cover 24. The vent opening continues from cavity 22 to the outside face of the cap, as shown at 22', and is thus protected by the cover 24 from becoming clogged by dust particles.

Housing section 4 is formed with a large opening 26 at its upper end wall. The inner annular wall 18 of cap 8 constitutes an open cylinder facing and in alignment with opening 26. Opening 26 defines a passageway for receiving an axially movable control member, generally designated 28 coaxial with float 14. One end 30 of control member 28 is inwardly tapered and is disposed within main chamber 12. The opposite end 32 of the control member is disposed within the cylinder formed by the inner annular wall 18 of cap 8 and defines, with that cylinder, a second or vent chamber 34 communicating with the small vent opening 20 in the upper end of cap 8. Control member 28 is further formed with an axially extending bore 36 establishing communication between the main chamber 12 and the vent chamber 34.

Figure 5:
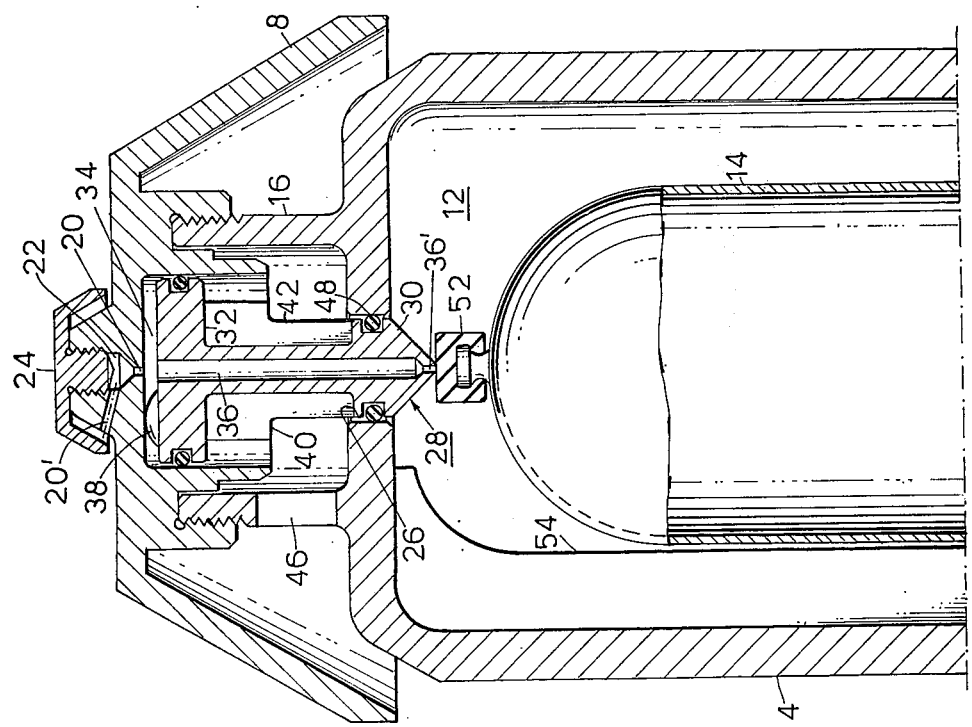
FIG. 5 is a partial view corresponding to that of FIG. 1 but showing the control member in its large-vent closing position.

Control member 28 is axially movable within passageway 26 from a first position further into the main chamber 12 as illustrated in FIG. 1, to a second position further into the vent chamber 34, as illustrated in FIG. 5. The face 32 of the piston is formed with embossments 38 to space same from vent opening 20 in the mentioned second position of the control member. An annular shoulder 40 formed in the control member between its two ends 30, 32, engages the upper surface of housing section 34 to define the mentioned first position of the control member.

The portion of the control member 28 between its two ends 30, 32 is formed with a plurality of axially-extending ribs 42 which engage the side walls of passageway 26 during the axial movement of the control member. In the position of the control member illustrated in FIG. 1, the spaces 44 (FIG. 2) between ribs 42 provide a large vent for main chamber 12, this vent also including the spaces 46 between the annular array of posts 16.

In the second or upper position of control member 28, as illustrated in FIG. 5, the foregoing large vent is closed by the lower, rib-free end 30 of the control member being seated within passageway 26. A sealing ring 48 effects a seal between the control member and the side walls of the passageway 26 in the upper (FIG. 5) position of the control member, whereas a sealing ring 50 carried by piston 32 effects a seal between the piston and the cylinder 18 of vent chamber 34.

Thus, the lower end 30 of control member 28 movable within housing bore 26 constitutes a valve which is opened when the control member moves further into main chamber 12, and is closed when it moves further into vent chamber 34.

The mouth or inlet end of the small vent opening 20 formed in cap 3 is of substantially smaller diameter than the mouth or inlet end 36' of bore 36 extending axially through control member 28. In addition, the cross-sectional surface area of the control member within main chamber 12 is substantially less than that of piston 32 within vent chamber 34. The significance of this arrangement will be fully described below.

As one example, the diameter of the mouth 36' of opening 36 may be about 1.5 to 2 times that of the mouth of the small air vent opening 20, and the diameter of piston 32 may be about 1.5 to 2 times that of the diameter of the lower end 30 of the control member within the main chamber 12. For example, the diameter of mouth 36' may be 1.3 mm and that of opening 20 may be 0.8 mm; and the diameter of piston 32 may be about 30 mm and that of the lower end of the control member about 15 mm.

The upper end of float 14 carries a sealing member 52 which acts as a pilot valve element to close the mouth 36' of bore 36 when the float engages control member 28. In addition, the sides of housing section 4 are formed with axially extending ribs 54 guiding the movement of float 14 coaxial with the control member 28 and the float rises or descends, according to the quantity of water within main chamber 12. The water, as well as any air within it, enters the main chamber via inlet 56 formed in housing base 6, and passes through the spaces 58 (FIG. 4) defined by ribs 60 to enter the main chamber 12.

The device may be attached to a water line by threads 10 in base 6, the latter being formed with a hexagonal portion 62 to facilitate attachment with a wrench. When attached to the water line, it releases air in the line in the following manner:

When filling the pipeline with water, the main chamber 12 would contain little or no water, and therefore float 14 would be in its lowermost position, as illustrated in FIG. 1. In this position, its sealing member 52 is out of engagement with control member 28, and therefore bore 36' is open, thereby establishing communication between main chamber 12 and vent chamber 34. The pressure within the pipeline and the main chamber is thus transmitted to the vent chamber. Since the pressure-effective surface area of piston 32 within vent chamber 34 is substantially larger than the pressure-effective surface area of the lower end 30 of the control member within chamber 12, and since the mouth of bore 36 is of larger diameter than the mouth of vent opening 20, piston 32 will move the control member to its lowermost position furthermost in main chamber 12 as illustrated in FIG. 1. In this position, the recesses 44 (FIG. 2) between ribs 42 of the control member form a large vent during the filling operation for the exhaust of air from main chamber 12 externally to the atmosphere.

As this pipeline becomes filled with water, water will enter main chamber 12 of the relief valve causing float 14 to rise until it engages the lower end of control member 28 closing its bore 36. When this occurs, the pressure within vent chamber 34 drops towards atmospheric pressure, by virtue of the small vent opening 20, so that the greater pressure within the chamber 12 is effective to move control member 28 upwardly with the rise of the float. This will continue until embossment 38 of control member 28 contacts the back wall of cylinder 18, thereby limiting the further movement of the control member.

In this uppermost position of the control member, as illustrated in FIG. 5, sealing ring 48 at the lower end of the control member is seated within passageway 26, thereby closing the large vent constituted by the recesses 44 between ribs 42. Thus, water cannot escape through the main vent.

Now, if during the normal working conditions of the pipeline, air tends to accumulate in chamber 12, this will lower the level of float 14, causing same to disengage from the lower end of control 28, thereby opening bore 36. When this occurs, the pipeline pressure within chamber 12 is transmitted via bore 36 to the vent chamber 34, causing the control member to move downwardly, and thereby opening the large vent formed by recesses 44 between ribs 42. Some air is thus exhausted to the atmosphere through the large vent, and also to a smaller degree through the small vent openings 20.

As soon as a quantity of air has been exhausted such that the water within chamber 12 rises again, float 14 also rises and closes bore 36, causing control member to move upwardly by the pressure within chamber 12, as described earlier, thereby reclosing the large vent.

The air-relief valve thus operates automatically to release accumulated air and then to reclose to prevent the escape of water, all the time the line is under pressure. It thus performs the function of an automatic relief valve of the type mentioned earlier, but can be constructed at a substantially lower cost.

EMBODIMENT OF FIG. 6

FIG. 6 illustrates a variation wherein the large vent includes a separate large opening 70 formed in the upper end of main chamber 12. A valve member 72 having a conical seat 73 is adapted to seat within opening 70 in the uppermost position of regulating member 28 for closing the large vent; and to unseat from it when the regulating member moves to its lower position. Valve member 72 is formed with four ribs 74 guiding its movement within opening 70, and is moved into and out of the opening by means of linkage 76 connecting same to control member 28.

Further in FIG. 6, the outside surface of piston 32 movable within cylinder 18 to define chamber 34 is vented to the atmosphere by means of another vent opening 78 formed in annular wall 80 to which cap 8 is threaded. The structure and operation of the device of FIG. 6 is otherwise the same as described above with reference to FIGS. 1–5.

While the pressure-responsive valves illustrated in the drawings are particularly useful as air-relief valves operating in the manner described above, they could also be used in other applications, such as water traps for separating entrained liquid droplets from steam vapor or from pneumatic lines. When used for this purpose, the valve would be attached to the line in an inverted position, with base 6 serving as the inlet and constituting the upper end of the housing, and cap 8 having the vents constituting the lower end of the housing. Thus, the water would tend to collect in the passageway 26 portion of the housing, and the steam vapor (or air) would be in the inlet 56 end of the housing.

During operation as a water trap, water contained in the steam or gas would accumulate and settle within the housing, thereby causing float 14 to move away from bore 36 of control member 28, whereupon the pressure within vent chamber 34 would tend to move the control member towards the float. This would open the large vent, permitting the water to be removed. As soon as the water level within the inverted housing dropped, float 14 would return back into engagement with bore 36 of the control member 28, closing that bore, whereupon the pressure within chamber 14 would cause control member 28 to move towards the small vent opening 34. This would close the larger vent, in the manner described above.

It will be appreciated that many modifications could be made in the described embodiments. Thus, the piston and cylinder defining the vent chamber 34 could be reversed, so that the cylinder is carried by the control member 28 and the piston is fixed to the housing. Further, float 14 could be of spherical or other shape, rather than the cylindrical shape illustrated. In addition, the displacement of control member 28 could be used for controlling other devices rather than a vent in an air-relief valve, such as electric device for providing a signal or control to another device when the float has risen to a predetermined level.

Further variations, modifications and applications of the illustrated embodiments will be apparent.

What is claimed is:

1. A liquid-level responsive valving device comprising: a housing defining a first chamber and including an end wall having a central opening therethrough; an annular support circumscribing said opening externally of said first chamber; a cap including an inner annular wall and an outer annular wall coaxial therewith, said outer annular wall being internally threaded and threadedly received on said annular support with the inner annular wall constituting an open cylinder facing and in alignment with said opening in the housing end wall; a control member axially movable in said opening and having a first end disposed within said first chamber and an opposite end carrying a piston movable within said cylinder and defining a second chamber therewith; said second chamber having a small vent opening in a wall thereof; said control member being formed with a bore extending axially therethrough and establishing communication between the two chambers; the cross-sectional area of said first end of the control member in the first chamber being less than that of said opposite end thereof in the second chamber, and the mouth of the bore at said one end of the control member in the first chamber being of larger diameter than that of the vent opening in the second chamber, such that upon an increase in pressure in the first chamber, the pressure in the second chamber is likewise increased which pressure, by virtue of the larger surface area in the second chamber, causes the control member to be moved further into the first chamber; a float in the first chamber coaxial with and axially spaced from the control member; a pilot valve element fixed to the end of the float facing said first end of the control member; said float being movable towards and away from said first end of the control member according to the quantity of liquid in the first chamber to bring the pilot valve element into engagement therewith to close the mouth of said bore whereupon the pressure in the first chamber moves the control member away from the float and further into said second chamber, or in disengagement therefrom to open the mouth of the bore whereupon the pressure in the second chamber moves the control member towards the float and further into said first chamber, guiding means in the first chamber guiding the movement of the float towards and away from the control member; and a main valve communicating with the first chamber and operated by the control member such as to be opened upon the movement of the control member further into the first chamber and to be closed upon the movement of the control member further into the second chamber.

2. A device according to claim 1, wherein said valve includes recesses formed axially of the control member for a part of the length between its two ends.

3. A device according to claim 1, wherein said valve includes a separate large opening formed in the first chamber, a valve member seatable within said large opening, and linkage connecting the control member to the valve member to unseat the latter from the large opening when the control member moves further into the first chamber, and to seat same therein when the control member moves further into the second chamber.

4. An automatic relief valve for separating a gas from a liquid comprising the device of claim 1, wherein said valve communicating with the first chamber is constituted of a large-orifice vent which is opened by the movement of the control member further into the first chamber, and is closed upon the movement of the control member in the opposite direction further into the second chamber.

5. An automatic relief valve according to claim 4, for use as an air release valve in a water supply line, wherein said second chamber is disposed vertically above the first chamber and coaxial with the first chamber, the control member and the float, said small vent in the second chamber being formed in the top wall of the housing.

* * * * *